United States Patent [19]

Imai et al.

[11] Patent Number: 4,987,482
[45] Date of Patent: Jan. 22, 1991

[54] IMAGE PICKUP APPARATUS HAVING EXPOSURE CONTROL FOR HUMAN SUBJECTS

[75] Inventors: Kunio Imai; Hideo Homma, both of Tokyo; Teruo Hieda, Kanagawa, all of Japan

[73] Assignee: Canon Kabushiki Kaisha, Tokyo, Japan

[21] Appl. No.: 261,567

[22] Filed: Oct. 24, 1988

[30] Foreign Application Priority Data

Oct. 27, 1987 [JP] Japan .................................. 62-269333
Nov. 2, 1987 [JP] Japan .................................. 62-275866

[51] Int. Cl.$^5$ .......................................... H04N 5/243
[52] U.S. Cl. .......................................... 358/41; 358/55
[58] Field of Search ........................... 358/41, 55, 228

[56] References Cited

U.S. PATENT DOCUMENTS 4,682,211 7/1987 Kaji .................................... 358/41

Primary Examiner—Howard W. Britton
Assistant Examiner—Kim Yen Vu
Attorney, Agent, or Firm—Robin, Blecker, Daley & Driscoll

[57] ABSTRACT

An image pickup apparatus for outputting an image pickup signal by forming an image of a subject on an image pickup element through an optical system includes a determining circuit for picking up a plurality of color information signals from the image pickup element, comparing the color information signals with a predetermined reference value to determine that the color information signals reach a predetermined level and detecting quantity of a skin color signal component; and a control circuit for controlling the exposure of the image pickup element in accordance with the result of the determination.

17 Claims, 4 Drawing Sheets

IMAGE PICKUP APPARATUS HAVING EXPOSURE CONTROL FOR HUMAN SUBJECTS

BACKGROUND OF THE INVENTION

1. Field of the Invention

This invention relates to an image pickup apparatus, and, more particularly to an image pickup apparatus for a TV camera which enables the most favorable exposure when humans are the subject of the image.

2. Description of the Related Art

There is a type of image pickup apparatus for a TV camera which automatically controls exposure at the most suitable level, it being classified into two types as follows: that is, a full-plane average light measuring type, and a center-weighted light measuring (spot measuring) type.

FIG. 1 is a schematic view illustrating an essential portion of a conventional image pickup apparatus. Referring to FIG. 1, an operation will be briefly described.

Referring to FIG. 1, reference numeral 101 represents a lens, and reference numeral 102 represents a diaphragm (iris) for controlling the quantity of light. Reference numeral 103 represents an image pickup element, reference numeral 104 represents an amplifier, and reference numeral 340 represents a gate circuit. Reference numeral 330 represents an integrator, reference numeral 181 represents a comparator, reference numeral 112 represents an iris driving circuit, and reference numeral 350 represents a gate signal generator.

Incidental light from a subject, via the lens 101, reaches the iris 102 at which the quantity of light is adjusted properly, and is introduced into the image pickup element 103. Next, a signal voltage (current) in accordance with the light from the subject is obtained. This signal is amplified by the liner amplifier 104 so as to be introduced into a monitor 104" via the ensuing processing circuit 104'. The gate circuit 340 controlled by the gate signal generator 350 determines a light measuring frame of the picture plane for the output signal from the amplifier 104. Only the signal within this light measuring frame is introduced into the integrator 330 where the same is integrated. The thus-integrated signal is compared with a reference level 182 by the comparator 181, and the output therefrom controls the iris 102 via the iris driving circuit 112. At this time, if the gain of the comparator 181 is sufficiently great, the iris 102 is controlled by a controlling loop thereof in such a manner that the integrated value of the image signal within the light measuring frame becomes the same as the reference value 182. If the light measuring frame determined by the gate circuit 340 comprises the entire picture plane, the system can be called a full-plane average light measuring type, while the system can be called a center-weighted light measuring or the spot measuring type. In a case of the center-weighted light measuring method, weighting is sometimes performed so as to make the central portion of the picture plane maximum. Since such weighting of the type described above cannot be performed by a mere gate circuit shown in FIG. 1, the product of the image signal and the weight signal needs to be obtained by using, for example, a multiplier.

However, a conventional light measuring method of the type described above involves the following problems: that is, in the full-plane average light measuring, since the subject image disposed against the light exhibits great luminance in the portion against the light, the diaphragm moves to be closed if the diaphragm is controlled by an averaged signal, causing for the subject image to be darkened and hidden.

On the other hand, in a case where a brilliant subject image is disposed in front of a dark background, the diaphragm is moved in the direction to be opened since the average level of the image signal is reduced. Therefore, the subject image becomes excessively highlighted.

In a case where the center-weighted light measuring method, the most suitable exposure can be obtained when the subject image is disposed at the central portion of the picture plane. However, if the subject image deviates off the central portion, the similar phenomenon to the full-plane average light measuring occurs. That is, in a case where the subject is disposed against light, the subject becomes dark and hidden, while in a case where the same is disposed in the dark background, the subject image becomes excessively highlighted.

In particular, since a video camera of the type described above performs the signal detection in response to a luminance signal lacking a red or blue component, the diaphragm cannot be adjusted suitably if the color of the subject image disposed in the above-described specific portion is thick (in particular in a blue of red case), causing the diaphragm to be excessively opened.

As described above, in the conventional image pickup apparatus, since signal detection is performed in response to the luminance signal lacking a blue or red component, a problem arises in that the degree of diaphragm setting cannot be suitably adjusted depending upon the color of the subject image when the incidental light is diaphragm-controlled by using a specific portion of the image signal.

SUMMARY OF THE INVENTION

To this end, an object of the present invention is to provide an image pickup apparatus capable of overcoming the above-described problems experienced with the conventional apparatus, this image pickup apparatus being capable of enabling the most suitable exposure regardless of the position and the background of the subject image.

Another object of the present invention is to provide an image pickup apparatus capable of overcoming the above-described problems, this image pickup apparatus being capable of enabling the most suitable exposure when humans are subject of the image.

In order to achieve the above-described objects, an image pickup apparatus according to an embodiment of the present invention comprises: determining means for picking up a plurality of color information signals from the image pickup element and comparing the color information signal with a predetermined reference value for the purpose of determining that the same reaches a predetermined level, and control means for controlling the exposure of the image pickup element in accordance with the result of the determination by changing the quantity of integration of the image pickup signal.

As a result of the thus-obtained exposing mechanism controlling method, the most suitable exposure can be always obtained when the human's skin or the like is the subject of the image.

Furthermore, in order to achieve the above-described objects, an image pickup apparatus according to another embodiment of the present invention comprises: diaphragm control means for controlling the diaphragm by picking up a signal obtained from an image pickup element, compensation signal generating means for generating a compensation signal in accordance with color signal information of the picked up signal, whereby the control value of the diaphragm control means is compensated in response to the compensation signal from the compensation signal generating means.

Other objects and characteristics of the present invention will be apparent from the following description of the specification and the accompanying drawings.

DETAILED DESCRIPTION OF THE PREFERRED EMBODIMENTS

Figure 1:
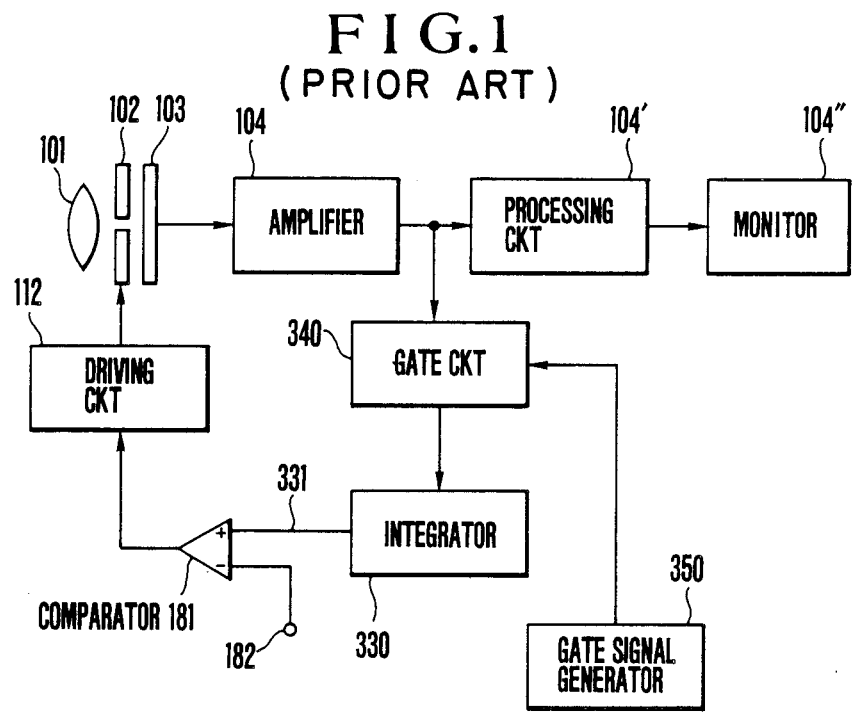
FIG. 1 illustrates schematically an essential portion of a conventional image pickup apparatus.
Figure 2:
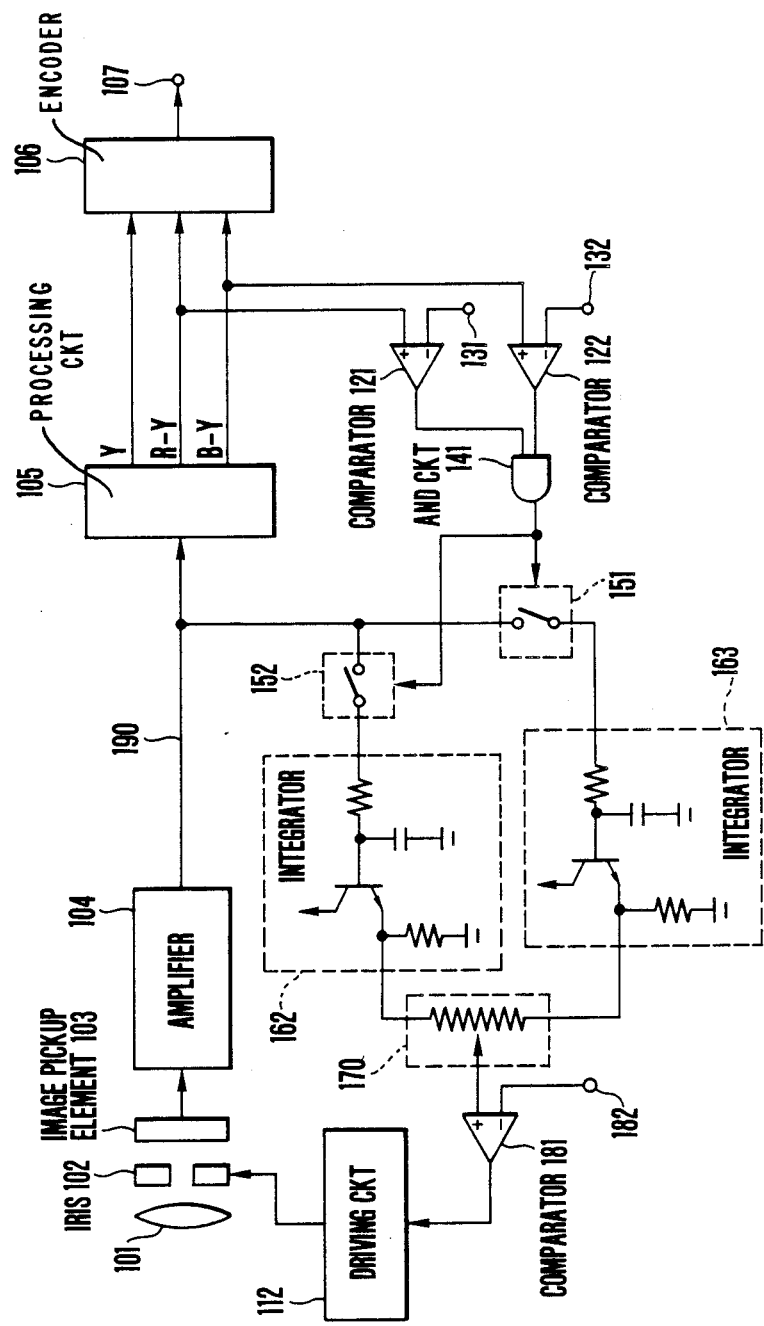
FIG. 2 illustrates an image pickup apparatus according to an embodiment of the present invention.

FIG. 2 illustrates an image pickup apparatus according to an embodiment of the present invention. Referring to this figure, reference numeral 105 represents a processing circuit for processing an amplified video signal and for obtaining a luminance signal Y and color difference signals R-Y and B-Y. Reference numeral 106 represents an encoder for obtaining output signals of NTSC or PAL system in response to the luminance signal and the color difference signals obtained by the processing circuit 105. Reference numeral 107 represents an output terminal of the encoder 106. Reference numerals 121 and 122 represent comparators to which the above-described color difference signals R-Y and B-Y are respectively input, and for outputting them after making comparison with reference levels 131 and 132. Reference numeral 141 represents a logical product (AND) circuit to which the outputs from the above-described two comparators 131 and 132 are input. Reference numeral 152 represents a switch controlled to be closed when the output from the above-described AND circuit 141 is at a low level. Reference numeral 162 represents a first integrator for integrating the video signal 190 which has not yet been processed by the processing circuit 105. Reference numeral 151 represents a switch which is closed when the output from the AND circuit 141 is at a high level. Reference numeral 163 represents a second integrator for integrating the video signal 190 input via the above-described switch 151. Reference numeral 170 represents a mixer for mixing the outputs from the first integrator 162 and the second integrator 163, wherein the output from the first integrator 162 is arranged to display larger mixture ratio than that of the second integrator 163. Reference numeral 181 represents a comparator for performing comparison the output from the above-described mixer 170 with a reference voltage 181. Reference numeral 112 represents a driving circuit for driving an iris 102 by receiving the output from the comparator 181. The same reference numerals as those in FIG. 1 represent the same or equivalent portions.

In the circuit shown in FIG. 2, light from the subject of the image is made incident via a lens 101, and its quantity is adjusted to become most suitable. The light reaches an image pickup element 103. An electric signal corresponding to the quantity of the incident light from the corresponding image points of the subject of the image is picked up from each of picture elements, which are disposed on a plane, of the image pickup element 103. The thus-picked up electric signals are amplified by the amplifier 104, and are supplied to the processing circuit 105 wherein they are subjected to a gamma correction or the like. Next, a luminance signal Y and color difference signals R-Y and B-Y are processed in a matrix circuit in the processing circuit 105. The comparator 121 compares the value of the color difference signal R-Y with the reference value 131. If the value of the color difference signal R-Y is positive, the output of the comparator 121 becomes high level, while the same becomes low level if it is negative. The comparator 122 compares the value of the color difference signal B-Y with the reference value 132. If the value of the color difference signal B-Y is negative, the output becomes high level, while the same becomes low level when it is positive. If both the outputs from the comparators 121 and 122 are at a high level (i), the output from the AND circuit 141 also becomes high level so that the luminance signal 190 is supplied to the integrator 163, and simultaneously the switch 152 is opened to stop supply of the pre-processed luminance signal 190 to the integrator 162. If both of them are not at a high level (ii), the output from the AND circuit 141 becomes low level, causing the switch 151 to be opened to stop supply of the luminance signal 190 to the integrator 163, and simultaneously the switch 152 is closed to supply the luminance signal 190 to the integrator 162 wherein it is integrated.

The above-described process of detecting the level of the color difference signal and supplying the luminance signal 190 to each of the integrators 162 and 163 are intended to select information on the luminance of the subject of the image including the color near skin color.

Figure 3:
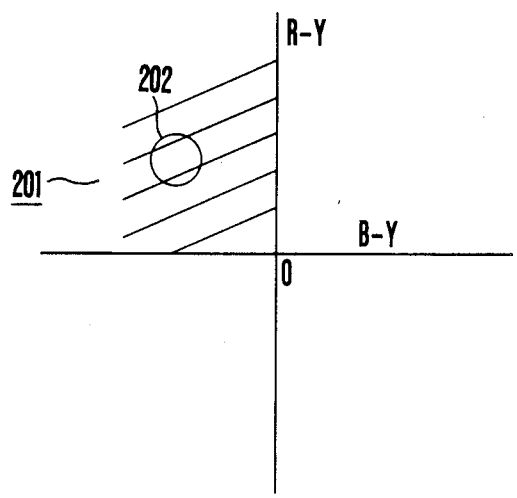
FIG. 3 illustrates the position of the skin color and the quadrant including the skin color on the color difference signal coordinate.

FIG. 3 illustrates the position of the skin color and the quadrant including the former in the color difference signal coordinate. Reference numeral 201 represents a quadrant including skin color on the quadrant. Reference numeral 202 represents the coordinate for skin color, wherein the axis of ordinate represents R-Y, while the axis of abscissa represents B-Y. Referring to FIG. 3, skin color is present in the quadrant where the color difference signal R-Y is positive, while the color difference signal B-Y is negative.

Accordingly, by subjecting to the above-described processes by the circuit shown in FIG. 2, the luminance signals representing the subject of the image ranging from yellow to red are integrated by the integrator 163, while the luminance signals representing other color and no-color are integrated by the integrated by the integrator 162. Therefore, as described above, by mixing the output from the integrator 163 and the output from the integrator 162 in such a manner that the former is relatively larger than the latter by the mixer 170, the iris 102 can be controlled to take preference of the color in the quadrant including skin color.

As described above, according to this embodiment of the present invention, the most suitable exposure can be always obtained when the subject of the image is of the color near skin color from yellow to red.

Figure 4:
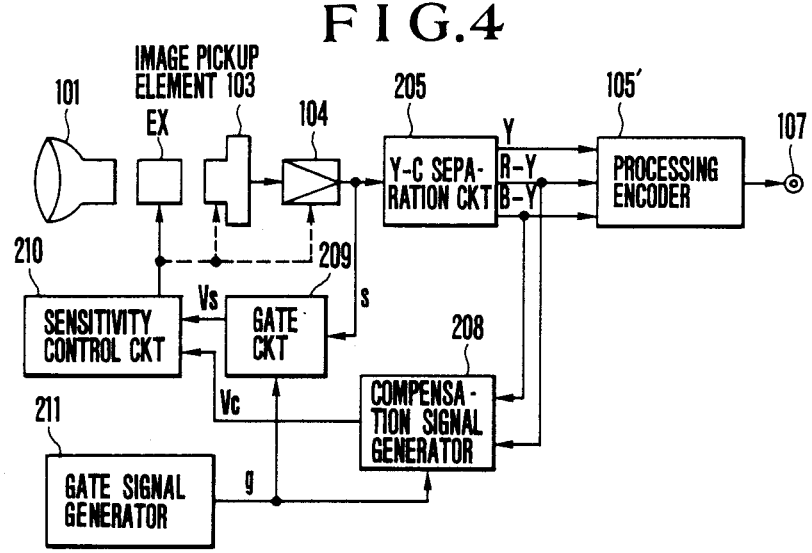
FIG. 4 is a block diagram illustrating an essential portion of an image pickup apparatus according to a second embodiment of the present invention.

FIG. 4 is a block diagram illustrating an essential portion of an image pickup apparatus according to a second embodiment. Reference numeral 101 represents a lens. Symbol EX represents an exposing member including a diaphragm for changing the quantity of incident light and/or a light shielding member such as a shutter. Reference numeral 103 represents an image pickup element comprising a CCD or MOS and a driver for the same. Reference numeral 104 represents an amplifier. Reference numeral 205 represents a Y-C separation circuit for separating the luminance signal Y and the color difference signals R-Y and B-Y from an input signal S by using a sample and hold circuit and a low-pass filter. Reference numeral 105' represents a processing encoder for synthesizing a standard TV signal from the luminance signal Y and the color difference signals R-Y and B-Y. Reference numeral 107 represents an output terminal. Reference numeral 207 represents a compensation signal generator for generating a compensation signal Vc from the color difference signals R-Y and B-Y. Reference numeral 209 represents a gate circuit for cutting the input signal S and having an integrating circuit. Reference numeral 210 represents a sensitivity control circuit for controlling the sensitivity of the image pickup apparatus by comparing the signal Vs from the gate circuit 209 with the compensation signal Vc. Reference numeral 211 represents a gate signal generator for generating a gate signal g which represents the level of the portion to be light-measured.

With the image pickup apparatus shown in FIG. 4, the image of the subject of the image (omitted from the illustration) passes through the lens 101 wherein the quantity of the light and the time period of incidence of the same are controlled by the exposing member EX so that the same is imaged and photoelectrically-converted to become an image pickup signal, and it is provided an an output. The thus-output image pickup signal is amplified by the amplifier 104. The output s of the amplifier 104 is separated into the luminance signal Y and the color difference signals R-Y and B-Y by the Y-C separation circuit 205, and is synthesized to become the standard TV signal by the processing encoder 105'. The thus-synthesized standard TV signal is output by the output terminal 107 to a peripheral equipment. The output s of the amplifier 104 is also input to the gate circuit 209 where only the portion of the same corresponding to the gate signal g can pass through the gate circuit 209. The thus-passed signal is, in the form of the signal Vs, input to the sensitivity control circuit 210. The color difference signals R-Y and B-Y are also input to the compensation signal generator 208 so that the compensation signal Vc is generated and is input to the sensitivity control circuit 210. The sensitivity control circuit 210 compares the average value of the signal Vs with the compensation signal Vc for controlling the exposing member EX, the sensitivity of the image pickup element 103 itself, the photoelectric conversion storing time of the image pickup element 103, the gain of the amplifier 104, or the combination of them. The exposing member EX, the image pickup element 103, the amplifier 104, the gate circuit 209 and the sensitivity control circuit 210 form a feed-back loop which acts to making the level of average value of the signal Vs and that of the compensation signal Vc coincide with each other.

Figure 5:
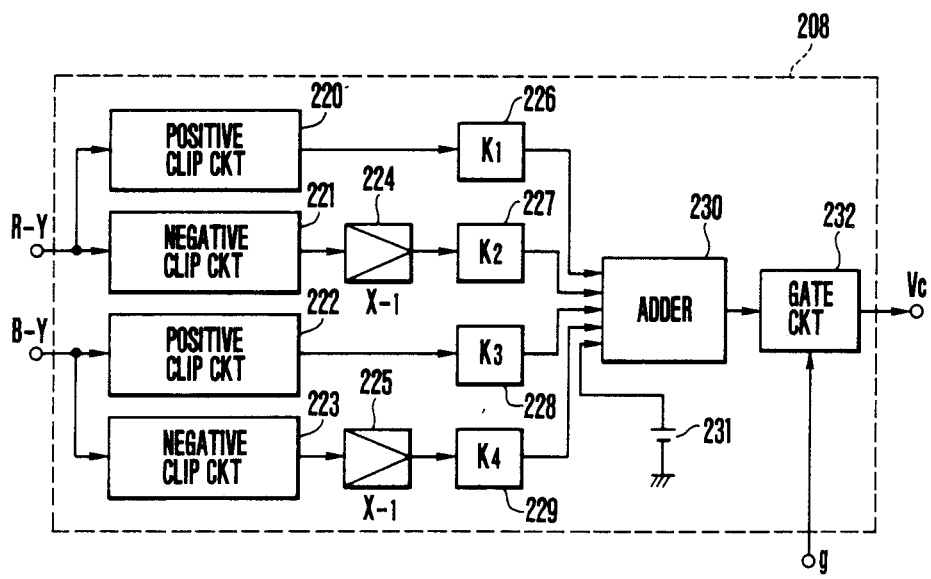
FIG. 5 is a block diagram illustrating in detail an essential portion of the compensation signal generator shown in FIG. 4.

FIG. 5 is a block diagram illustrating the details of the compensation signal generator 208 shown in FIG. 4. Reference numerals 220 and 222 represent positive clip circuits, reference numerals 221 and 223 represent negative clip circuits, and reference numeral 224 and 225 represent inverting amplifiers. Reference numerals 226, 227, 228, and 229 each represent a multiplier for multiplying constants $K_1$, $K_2$, $K_3$ and $K_4$. Reference numeral 230 represents an adder, reference numeral 231 represents a reference voltage, and reference numeral 232 represents a gate circuit. Only the negative portion of the color difference signal R-Y input by the Y-C separation circuit 205 shown in FIG. 4 is picked up by the positive clip circuit 220. The thus-picked up portion is multiplied by $K_1$ by the multiplier 226. The thus-multiplied portion is input to the adder 230. On the other hand, only the positive portion of the same is picked up by the negative clip circuit 221, and is inverted by the inverting amplifier 224. Then it is multiplied by $K_2$ by the multiplier 227, and is input to the adder 230. Similarly, the negative portion of the color difference signal B-Y picked up by the positive clip circuit 222 is multiplied by constant $K_3$ by the multiplier 228, while the positive portion of the same picked up by the negative clip circuit 223 is inverted by the inverting amplifier 225. Then it is multiplied by constant $K_4$ by the multiplier 229, and is input to the adder 230. The adder 230 adds the input from each of the above-described multipliers 226, 227, 228 and 229 and the reference voltage 231 so as to output the results a the addition. As a result of this, only the portion represented by the gate signal g is output from the gate circuit 232 in the form of the compensation signal Vc. The constants $K_1$ to $K_4$ are defined as follows. Assuming that the level of the output S of the amplifier 104 at the time of white subject is imaged is 1, and the level of the output S of each subject R (red), G (green), and B (blue) are $S_R$, $S_G$ and $S_B$, respectively:

$S_R = 0.3$
$S_G = 0.6$
$S_B = 0.1$.

Each of $S_R$, $S_G$ and $S_B$ is smaller than 1 although this value depends upon the type of the color filter of the image pickup element 103. Therefore, if the value of the compensation signal Vc at this time becomes the same as each of $S_R$, $S_G$ and $S_B$, the proper level can be obtained. In order to realize this state, the following value of the constants $K_1$, $K_2$, $K_3$ and $K_4$ are obtained.

$K_1 = 0.33$
$K_2 = 1$
$K_3 = 0.33$
$K_4 = 1$

Figure 6:
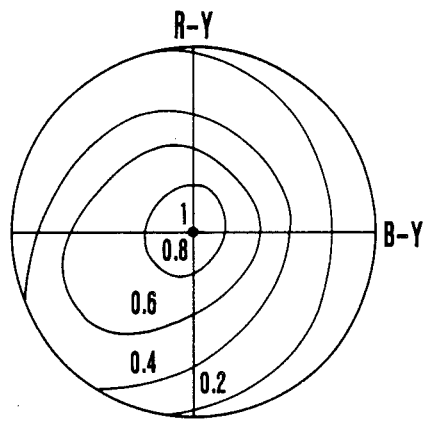
FIG. 6 illustrates the value of the compensation signal Vc when the value of the color difference signals R-Y and B-Y shown in FIG. 5 are changed.

FIG. 6 shows the value of the compensation signal Vc when the value of the color difference signals R-Y and B-Y shown in FIG. 5 are changed. When the color difference signal R-Y=0 and B-Y=0, the compensation signal Vc=1. The value of the compensation signal Vc becomes smaller in accordance with increase in thickness of color.

Figure 7:
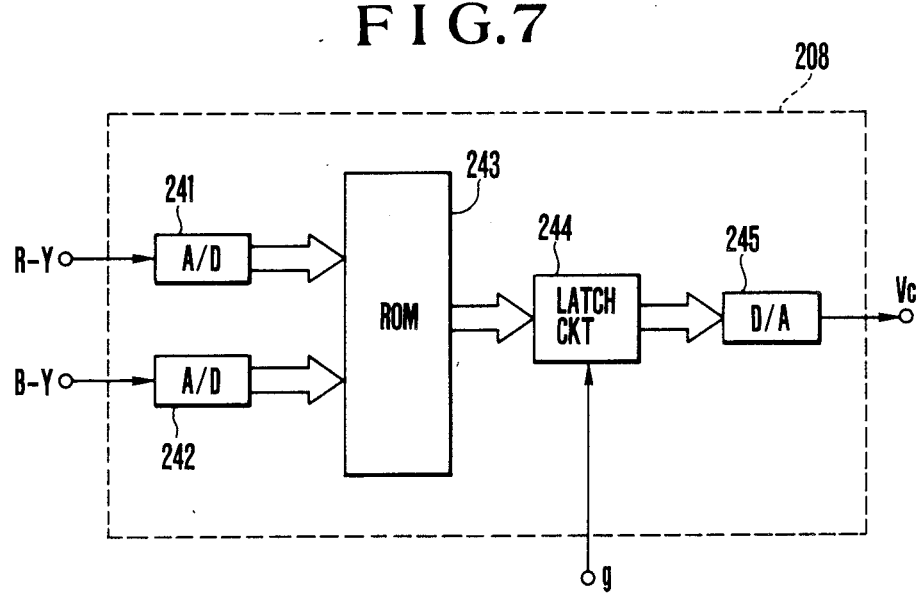
FIG. 7 is a block diagram illustrating in detail an essential portion of a compensation signal generator shown in FIG. 4 according to another embodiment.

FIG. 7 is a block diagram illustrating the details of an essential portion of a compensation signal generator 208 according to another embodiment. Reference numerals 241 and 242 represent analog-digital converters (A/D converters). Reference numeral 243 represents a read only memory (ROM) for changing a table. Reference numeral 244 represents a latch circuit, and reference numeral 245 represents a digital-analog converter (D/A converter). The input color difference signals R-Y and B-Y are each converted to a digital signal by the A/D converters 241 and 242, and are, in the form of the address signal, input to the table-changing ROM 243. Since the value shown in FIG. 6 is written as the table data in the ROM 243, the data output corresponding to the value of the color difference signals R-Y and B-Y can be obtained. This data output is converted, through the latch circuit 244, by the D/A converter 245 to the compensation signal Vc in the analog form. The color signal is controlled by the gate signal g in the latch circuit 244 so that the data output of only the portion corresponding to the gate signal g is picked up. The thus-picked up compensation signal Vc is input to the sensitivity control circuit 210 shown in FIG. 4 so that it is processed.

Although in the embodiment shown in FIG. 4, the input of the compensation signal generator 208 comprises the color difference signals R-Y and B-Y, it may be an I signal, Q signal, primary color signal or the complementary color signal. Furthermore, the gate signal 209 may act to change the output value which has been weighted in accordance with the level of the gate signal as an alternative to a circuit only performing cutting.

Although the described sensitivity control circuit 210 comprises the feed-back type exposure controlling circuit, it can be applied to the method in which a photosensor is individually provided from the image pickup element for the purpose of controlling the sensitivity in accordance with the specific color component of the photosensor output.

Furthermore, the exposing member EX is not limited to the mechanical diaphragm or shutter, it can be applied to the same performing electrical shutter action or the same which electrically and physically changes the transmissivity.

As described above, according to the first and second embodiments of the present invention, the image pickup apparatus in which error in the luminance level due to the color of the subject can be prevented can be obtained.

What is claimed is:

1. An image pickup apparatus for outputting an image pickup signal by forming an image of a subject on an image pickup element through an optical system, comprising: determining means for detecting quantity of a skin color signal component of the subject, and control means for controlling an exposure of said image pickup element in accordance with the result of the determination.

2. An image pickup apparatus according to claim 1, wherein said determining means detects the hue of the subject.

3. An image pickup apparatus according to claim 1, wherein said control means controls the exposure in order to make the luminance component of the skin color component at a given level.

4. An image pickup apparatus according to claim 1, wherein said control means controls the exposure by a diaphragm.

5. An image pickup apparatus according to claim 1, wherein said control means controls the exposure for said image pickup element in accordance with at least a part of a video signal obtained by said image pickup element.

6. An image pickup apparatus comprising exposure control means for controlling an exposure by picking up a signal obtained from an image pickup element, compensation signal generating means for generating a compensation signal in accordance with a skin color signal component, wherein said exposure control means is compensated in response to said compensation signal from said compensation signal generating means.

7. An image pickup apparatus according to claim 6, wherein said compensation signal generating means generates a compensation signal corresponding to the level of the skin color component.

8. An image pickup apparatus according to claim 7, wherein said exposure control means controls the exposure so as to make the luminance component of the skin color at a given level.

9. An image pickup apparatus according to claim 6, wherein said control means controls the exposure by a diaphragm.

10. An image pickup apparatus comprising:
    (a) image pickup means for converting an image of a subject to an electric signal;
    (b) detecting means for detecting a level of skin color component; and
    (c) control means for controlling, in accordance with an output of said detecting means, the level of an electric signal obtained from said image pickup apparatus.

11. An image pickup apparatus according to claim 10, wherein said detecting means detects the level of the skin color component of the electric signal from said image pickup means.

12. An image pickup apparatus according to claim 10, wherein said control means controlling quantity of light made incident upon said image pickup means.

13. An image pickup apparatus according to claim 10, wherein said image pickup means has a gain and said control means controls said gain.

14. An image pickup apparatus according to claim 10, wherein said image pickup means has an image pickup time period and said control means controls said image pickup time period.

15. An image pickup apparatus according to claim 14, wherein control means includes a light-shielding member for determining an image pickup time period.

16. An image pickup apparatus according to claim 14, wherein said control means determines the image pickup time period by controlling the time period of the signal stored in said image pickup means.

17. An image pickup apparatus according to claim 10, wherein said image pickup means has a sensitivity and said control means controls said sensitivity.

* * * * *